३,219,996
TRANSDUCER SYSTEMS
George W. Masters, Jr., Griggstown, N.J., assignor to Electro-Mechanical Research, Inc., Sarasota, Fla., a corporation of Connecticut
Filed Nov. 21, 1961, Ser. No. 154,403
1 Claim. (Cl. 340—347)

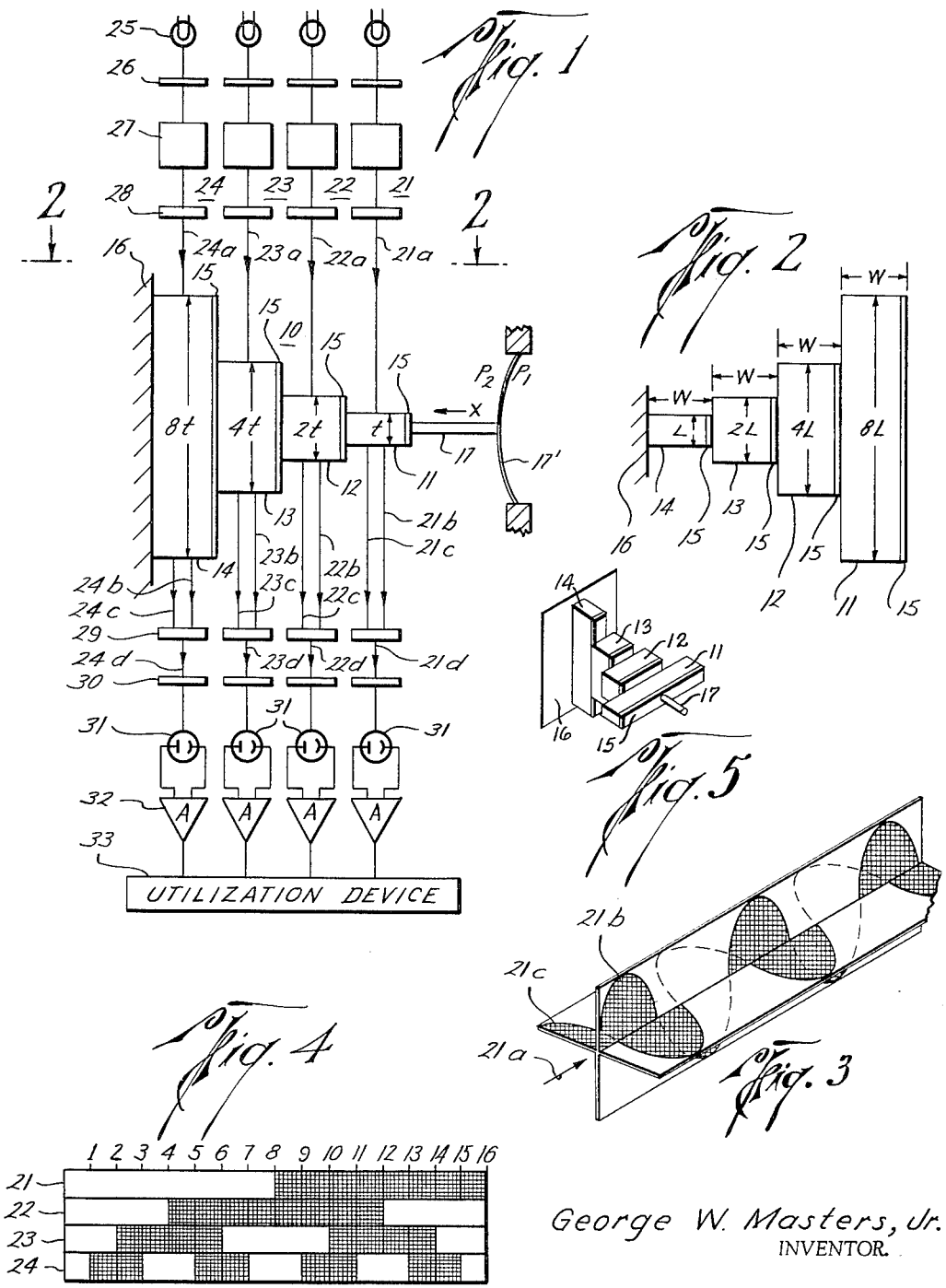

This invention generally relates to a method and apparatus for measuring changes in stress and more particularly to a method and apparatus for providing a continuous digital representation of such stress.

Basically two widely used methods are employed for representing quantitative information such as voltage, displacement, pressure, temperature, radiation, frequency, pulse duration, pulse count, etc. The first is the "analog" method which yields a parameter whose magnitude is related to the measured information by some predetermined function; the second is the "digital" method which results in coded groups of binary digits or bits, each group corresponding to some instantaneous value of the desired information. Familiar examples of digital codes are the Morse code, extensively employed in telegraphy, and the binary code, widely used in digital computer installations. Often however, it is not convenient to encode directly the information as it is received from the primary transducer. As a result, one or more preliminary analog-to-analog conversions may first be required prior to making the desired analog-to-digital conversion.

In prior art analog-to-digital converters for digitizing analog quantities, a great number of moving mechanical parts, such as gears, disks, levers and cams, for example, are typically employed. Because of their relatively great mass, such mechanical parts generally introduce undesirably large inertia effects causing an appreciable time lag between the input analog quantities and their corresponding output digital numbers. Moreover, to achieve workable accuracies, the machining of the mechanical parts must be maintained within very close tolerances thereby compounding the cost of the analog-to-digital conversion equipment.

It is an object of the present invention, accordingly, to provide new and improved analog-to-digital converters which are devoid of the above-noted and other apparent deficiencies in the prior art.

Another object of the invention is to provide new and improved encoders in which few or no moving mechanical parts are required to perform the analog-to-digital conversions.

Still another object of this invention is to provide new and improved digital encoders which receive input analog quantities corresponding to measured variables and which provide substantially instantaneously output coded electrical signals.

Yet a further object of the invention is to provide new and improved digital encoders which require few and relatively inexpensive parts and which have a substantially instantaneous response time.

Broadly speaking, these and other objects of the invention are attained by stressing a photoelastic member to modify phase shifts of refracted radiant-energy waves from said member in accordance with values of input quantities and by directing the thusly phase shifted beams to radiant energy sensing devices for deriving groups of coded electrical signals.

In a preferred embodiment of the invention, the geometric configuration of the photoelastic or strain member is such as to yield portions thereof of increasing thickness, each portion, however, presenting a substantially constant cross-sectional area to the input force or pressure. For convenience, the employed electromagnetic waves are light waves, the length of the light path within each portion being suitably proportioned in accordance with the desired code. Depending upon the required accuracy of resolution, a number of photosensitive devices are suitably situated adjacent to the strain member. The combined output of all the sensing devices constitutes a digital representation of the stress within the strain member and, thus, of the input variable quantity which produced the stress.

The invention may be better understood from the following detailed description, taken in conjunction with the accompanying drawings in which:

FIG. 1 illustrates schematically encoder apparatus constructed according to the invention;

FIG. 2 is a top view of the strain member of FIG. 1; and

FIGS. 3 and 4 are helpful in explaining the operation of the encoder apparatus of FIG. 1, and FIG. 5 shows a perspective view of the strain member of FIG. 1.

Referring now more particularly to FIG. 1, the encoder apparatus comprises a strain member 10 of a transparent, normally isotropic substance such as glass, Bakelite, Celluloid, fused quartz, etc. Such materials are known in the art as photoelastic substances. They all share the common property of being able to split, when stressed, an incident, plane-polarized, electromagnetic wave into two component waves generally traveling at different velocities. The total resulting phase difference between the emerging component waves from a photoelastic material is directly proportional to the applied stress, to the thickness of the material in the direction of the light path, and to the optical constants of the material.

To provide a code with more than one digit for greater resolution accuracy, the strain member 10 is preferably made of a number of "retardation plates" of varying thicknesses. The term retardation plate as used herein refers to a plate which, when stressed, is capable of splitting an incident, polarized light wave into two component waves traveling at different velocities.

To simplify the drawing, only four such plates 11–14 are shown. It will be understood that more or less than four plates may be provided, if desired. In general, the greater the number of plates the greater is the accuracy. The plates' thicknesses are proportioned in dependence upon the terms of the selected code. To avoid ambiguity readings, the cyclic binary Gray code is generally preferred, because, as is well-known in the art, it allows only one digit to change states between two consecutive digit numbers. For the Gray code, the thicknesses should be related as the terms of a geometric progression, namely, 1, 2, 4, 8 and so on. It is convenient to arrange the retardation plates so that for a given input quantity X of the applied force, each plate produces a phase shift only as a function of its thickness. This can be readily achieved by uniformly stressing each retardation plate.

In sum, it is convenient to have each retardation plate present the same cross-sectional area perpendicular to the input force and further to have the thickness of each successive plate double the thickness of its preceding plate.

This double requirement, as to cross-sectional area and thickness, may be satisfied, for example, by conveniently making each plate of a rectangular prism. If the thickness $t$ of plate 11 is taken as unity on the thickness scale, the length L of plate 14 is taken as unity on the length scale, and the width $w$ of plates 11–14 is held constant, it follows that, in order to satisfy the above-mentioned double requirement, the thickness of plate 12 should be $2t$, of plate 13 should be $4t$, and of plate 14 should be $8t$.

Similarly, the length of plate 13 should be 2L, of plate 12 should be 4L, and of plate 11 should be 8L.

Given such dimensions, it will be apparent that each of plates 11–14 has the same cross-sectional area, namely 8tL. Consequently, each plate is substantially uniformly stressed when a force is applied perpendicularly to such cross-sectional area. Better uniformity of stress distribution may be achieved if, between two adjacent plates, rigid covers 15, as of steel, are inserted. To allow the applied force to become either tensile or compressive, thereby permitting the input quantity X to assume either positive or negative values, these covers may be cemented to the respective plates with a suitable adhesive material.

To encode an input variable X, plate 14 may be placed against a permanent support member 16 whereas plate 11 may be connected directly to conventional mechanical transducers, as to accelerometers, force springs, temperature sensing devices, etc., each having a member whose displacements represent magnitudes of the variable X. If desired, plate 11 may also be attached to electro-mechanical or piezoelectric transducers as, for example, to the moving armature of a solenoid which is energized by electrical signals proportional to the amplitude of the input variable X. For the sake of completeness and simplicity of the drawing, plate 11 is shown subjected to a force X produced by the motion of a rigid bar 17 connected to a pressure diaphragm 17′, responsive to the relative values of pressures $P_1$ and $P_2$ on either side thereof; in this instance X is proportional to $(P_1-P_2)$. It should be understood, however, that although plate 14 is represented as being abutted against permanent support member 16, it could also be made responsive to a stress provided by a variable quantity Y so that the net stress within each retardation plate would correspond to (AX–BY) where A and B are proportionality constants.

In conjunction with strain member 10, four radiant-energy channels 21–24 (one channel for each retardation plate) are conveniently provided. On one side of the strain member 10, each channel includes: a source of radiant energy such as a light source 25, followed by a monochromatic filter 26, a collimating lens system 27, and a polarizer 28. On the other side of the strain member 10, each channel includes: an analyzer 29, a focussing lens system 30, and a photosensitive device such as a photocell 31. To simplify the drawing, the respective incident beams of light upon each retardation plate are represented as single light rays and are marked by the corresponding channel's numeral followed by the letter a. For reasons which will become clearer hereinafter, an incident ray of light upon a stressed retardation plate gives rise to two refracted rays lying in mutually perpendicular planes, as depicted in FIG. 3. The leading and lagging refracted rays are referenced with the numeral of the channel followed by the letters b and c respectively. After passing through the analyzer 29, the two refracted waves yield a uniplaner resultant ray marked by the letter d.

If a constant intensity light source is employed, the photoelectric cells 31 should preferably be shielded to avoid the surrounding light from reaching them. More conveniently, however, the incident light may be modulated by conventional means, as by applying alternating current to the light sources or by mechanically and periodically interrupting the incident beams of light. Depending upon the nature of the incident light employed, the output of each photocell is amplified either by a direct or by an alternating current amplifier 32.

In the preferred operation of the embodiment, the monochromatic filter 26 restricts the transmission of light to vibrations of a single wave length. The collimator 27 transforms the monochromatic light transmitted by filter 26 into collimated waves which consist of parallel bundles of light of small aperture. Collimated light is preferred in order to reduce the problems of refraction and dispersion. The polarizer 28 receives the monochromatic collimated light and transmits only those vibrations which are parellel to its direction of transmission. Thus, the retardation plate 11 of channel 21, for example, receives a monochromatic, plane-polarized, collimated light wave 21a.

When the material of the strain member 10 is free of stress, a plane-polarized beam of light passes through the member with only a slightly reduced velocity depending upon the member's index of refraction. When, for example, plate 11 is only very slightly stressed, the incident, plane-polarized beam 21a splits into two perpendicular, plane-polarized components 21b–21c, each component traveling at a different velocity, as shown in FIG. 3. Consequently, as the two refracted waves 21b–21c travel through the retardation plate 11, one wave starts to progressively fall behind the other wave and, hence, on emergence from the plate, the phase difference between the two waves become appreciably altered. This phase difference, or relative retardation, is directly proportional to the applied stress and to the retardation plate's thickness, which for plate 11 is t. The relative retardation between the two refracted waves 21b and 21c may be measured, for example, in inches and may constitute several wave lengths of the employed light. Since the geometry of the strain member 10 is such as to result in a substantially uniform stress within each of retardation plates 11–14, it is apparent that this relative retardation, for a given value of stress, is only a function of the plate's thickness.

A somewhat more rigorous explanation of the photoelastic phenomenon within the stressed retardation plates may be set forth as follows: upon the application of the input variable quantity X, each particle of the strain member becomes equally stressed. If we consider the stresses in every direction about a point in a stressed medium, it will be found that the envelope representing the vectors is an ellipsoid. The axes of such an ellipsoid are generally known as the "directions of principal stresses" and are conventionally designated as P, Q, and R. Usually, the stresses in the R direction are kept to zero and, therefore, the ellipsoid is reduced to an ellipse with axes P and Q only. The Q axis is taken as the direction of the tensile stress and the P axis, as the direction of the compressive stress. When a plane-polarized wave, such as 21a, impinges upon the stressed retardation plate 11, it splits into two component waves vibrating in two mutually perpendicular planes parallel to the direction of the principal stresses, as schematically represented in FIG. 3. The wave vibrating in a plane parallel to the direction of the compressive stress travels more rapidly than the wave vibrating in the direction of the tensile stress. Progressively, the two perpendicular component waves acquire a phase difference which increases with the plate's thickness. This phase difference or relative retardation is maintained after the component waves 21b and 21c emerge from plate 11.

For a uniform stress within the strain member 10, the relative retardation is directly proportional to the retardation plate's thickness. Consequently, the relative retardation caused by plate 14 is twice as large as that caused by plate 13. Similarly, the relative retardation caused by plate 13 is twice as large as that caused by plate 12, and so on. Depending upon the maximum stress per unit area that may be safely applied to the strain member 10 without exceeding its elastic properties, it is possible to achieve relative retardations equivalent to many wave lengths. It should be noted that because each retardation plate is substantially uniformly stressed, maximum utilization is made herein of the employed photoelastic material. In other words, the plate having the greatest thickness (and thus producing the greatest relative retardation) need not be overstressed compared to the stress within the plate having the smallest thickness.

It is convenient to measure the phase shift or relative retardation between the two refracted component waves, such as 21b–21c, by superimposing one component wave against the other. However, before this can be achieved, the two component waves must first be re-polarized so as to vibrate again in a single plane. This is the function of analyzer 29. It takes components of the two waves 21b–21c falling within its plane of polarization. Thus by introducing into the optical channel a properly oriented analyzer, the phase difference between the two refracted waves becomes apparent through interference effects.

The phenomenon of interference is based on the principle of super-position which states that the resultant wave at any point in space and at any instant of time between two or more component waves may be found by adding the magnitudes of the respective electric and magnetic field intensities (vectors) present at that point and at that instant. It can be readily shown that if, for example, the analyzer's plane of transmission is at right angles to that of the polarizer (the polarizer and analyzer are then said to be crossed), the intensities of the uniplaner components transmitted by the analyzer are substantially equal in magnitude but each component vibrates at a different frequency depending upon its velocity.

Since the two vibrations 21b and 21c transmitted by the analyzer 29 are now in a single plane, they are added algebraically to yield a resultant vibration 21d. Depending upon their instantaneous phase difference, the two uniplaner components forming the resultant vibration 21d alternately cancel and reinforce each other.

Consequently, the magnitude of the output signal from each photocell within each channel periodically increases and decreases as the relative retardation between the uniplaner component varies. For a given input quantity of the variable X, the stress within each retardation plate produces a corresponding relative retardation. Since the number of cycles representing the relative retardation is directly proportional to the thickness of the plate, it follows that the frequency at which the output from a photocell fluctuates is also proportional to the plate's thickness.

For example, when the relative retardation between waves 24b and 24c increases from zero, the illumination observed by photocell 31 of channel 24 alternately increases and decreases. The illumination undergoes one complete cycle when the relative retardation is equivalent to one wave length. The illumination observed by photocell 31 of channel 23 varies at half the frequency of the illumination observed by photocell 31 in channel 24. Similarly, the lights reaching the respective photocells of channels 22 and 21 also vary at correspondingly lower rates. It will be apparent that each photocell should be properly biased in order to distinguish between a binary 1 and a binary 0. If desired, a differential arrangement utilizing two crossed analyzers and two photocells per channel may be employed in order to reduce spurious effects. The outputs of the perspective photocells are amplified by amplifiers 32 and applied to a utilization device 33, such as a digital computer.

FIG. 4 schematically represents the relative number of light variations observed by each photocell within the respective channels 21–24. When the stress within the photoelastic member 10 is such as to cause the photocell 31 in channel 21 to produce a single-cycle signal, photocell 31 in channel 24 will have produced an eight-cycle signal. The cross-hatched blocks represent "dark" illumination, whereas the white blocks represent "bright" illumination. It will be apparent that the combined light intensity variations, as observed at a particular instant of time by each photocell within each channel, constitute the familiar digital representation in the binary Gray code of a particular stress distribution and, consequently, of the input quantity X or of (AX–BY), as previously explained.

Encoders constructed according to the invention may be adapted for a wide variety of uses which will readily occur to those skilled in the art. The range of stress magnitudes capable of being digitized by a typical encoder constructed in accordance with this invention depends upon the optical characteristics of the strain member, the resolution (number of binary digits) required, the allowable size of the device, the frequency of the light employed, and the specified operating enviromental conditions. Depending upon these and other apparent factors, the full-scale stress may vary from a fraction to many thousand pounds per square inch.

Thus, while the principles of the invention have been described and illustrated with reference to a preferred embodiment of an optical analog-to-digital converter for the purpose of teaching those skilled in the art how the invention may be practiced, changes in the components, units and assemblies will appeal to those skilled in the art and it is contemplated that such changes may be employed, but yet fall within the spirit and scope of the appended claim.

What is claimed is:

An analog-to-digital converter comprising:
a photoelastic member defining a plurality of sections, each section having the characteristic of splitting an incident plane-polarized monochromatic light wave into component waves traveling through each section at a velocity in dependence upon the stresses in that section,
said sections having relative dimensions which are related in accordance with a predetermined code,
strain producing means for exerting a force only against a single one of said sections in a direction perpendicular to the direction of said incident component waves,
each of said sections defining an equal cross-sectional area in a plane perpendicular to the direction of said force exerted by said strain producing means,
means for projecting plane-polarized, monochromatic light waves upon said member,
analyzer means for receiving the emerging light waves from said member,
means projecting said emerging light waves upon a plurality of photoelectric sensing devices, at least equal in number to said sections, and
means coupling the output of said photoelectric sensing devices to a utilization device.

References Cited by the Examiner

UNITED STATES PATENTS

| | | | |
|---|---|---|---|
| 2,966,673 | 12/1960 | Guernsey | 88—14 X |
| 3,052,152 | 9/1962 | Koester | 88—65 X |
| 3,087,148 | 4/1963 | Ludewig | 340—347 |

OTHER REFERENCES

Pages 107 to 109: June 1961—Ludewig "Digital Transducers" Control Engineering.

MALCOLM A. MORRISON, *Primary Examiner.*